(12) United States Patent
Nago

(10) Patent No.: US 7,961,648 B2
(45) Date of Patent: Jun. 14, 2011

(54) NETWORK FORMATION METHOD AND COMMUNICATION APPARATUS

(75) Inventor: Hidetada Nago, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 571 days.

(21) Appl. No.: 12/060,669

(22) Filed: Apr. 1, 2008

(65) Prior Publication Data
US 2008/0253302 A1 Oct. 16, 2008

(30) Foreign Application Priority Data

Apr. 16, 2007 (JP) ................................ 2007-107624

(51) Int. Cl.
*H04L 12/28* (2006.01)
*H04L 1/00* (2006.01)
*H04L 12/26* (2006.01)
*H04B 7/00* (2006.01)

(52) U.S. Cl. .......................... 370/254; 370/252; 370/310
(58) Field of Classification Search .................. 370/252, 370/254, 310
See application file for complete search history.

(56) References Cited

FOREIGN PATENT DOCUMENTS

| JP | 10-145276 | 5/1998 |
|---|---|---|
| JP | 2006-054707 | 2/2006 |
| JP | 2006-074450 | 3/2006 |

*Primary Examiner* — Ronald Abelson
(74) *Attorney, Agent, or Firm* — Cowan, Liebowitz & Latman, P.C.

(57) ABSTRACT

A determination is made as to whether a communication apparatus is a data sender or a data recipient and, based on the results of the determination, it is determined whether the apparatus constructs a network or joins a constructed network.

22 Claims, 11 Drawing Sheets

NETWORK FORMATION METHOD AND COMMUNICATION APPARATUS

BACKGROUND OF THE INVENTION

1. Field of the Invention

The present invention relates to a network formation method used for direct communication between communication apparatuses and a communication apparatus.

2. Description of the Related Art

Wireless LANs defined in IEEE802.11 (hereafter referred to as 802.11 wireless LANs) use the "infrastructure mode", in which communication is effected via access points between communication devices (communication terminals), and the "ad-hoc mode", in which communication is effected directly between communication devices. In the ad-hoc mode of an 802.11 wireless LAN, a communication device attempting to construct a network builds the network by transmitting a pilot signal called a beacon. Communication devices participating in the network join the network and effect communication based on information contained in such a beacon (beacon period, transmission rate, etc.).

Moreover, wireless communication parameters, such as communication channels, network identifiers, encryption methods, and cryptographic keys, have to be set to values common to all the communication devices that constitute the network. In an 802.11 wireless LAN, there are two network identifiers called "SSID" (Service Set Identification) and "BSSID" (Basic Service Set Identification) (see Japanese Patent Laid-Open No. 2006-74450 or Japanese Patent Laid-Open No. 2006-54707).

An SSID is an identifier that can be set to any arbitrary value by a user and can be pre-configured in a communication device. On the other hand, a BSSID is an identifier that is arbitrarily generated by the communication device constructing an ad-hoc network, that is, the communication device initially transmitting a beacon, based on its own MAC (Media Access Control) address, etc. When communication is effected on the same network, these two network identifiers have to be set to common values shared by the communication devices.

For instance, it is assumed that a common SSID is set in advance between two communication devices in order to effect communication therebetween in an ad-hoc mode. In such a case, an ad-hoc network is constructed when one of the communication devices generates a BSSID and initiates transmission of a beacon comprising the BSSID and the common SSID. The other communication device can join the constructed ad-hoc network by searching for a beacon and setting the BSSID for itself.

However, when two communication devices with the same SSID nearly simultaneously try to construct an ad-hoc network, two networks having different BSSIDs may be constructed as a result of generation of respective BSSIDs by each one of the communication devices. In such a case, communication between the two communication devices is rendered impossible despite the fact that a common SSID has been set.

As disclosed in Japanese Patent Laid-Open No. 10-145276, network construction is carried out by the device having more remaining battery capacity. However, it is not disclosed how the above-described duplicate network construction problem can be resolved.

Moreover, even if it turns out to be possible to avoid such a duplicate network construction problem and a network having a unique SSID and BSSID is constructed, the following problems may still arise.

When a communication device joins a network in the infrastructure mode, it carries out the process of association (logical connection) with an access point. The communication device determines the BSSID of the network by passive scanning or active scanning, configures the BSSID, and associates with the access point, thereby enabling communication in the infrastructure mode. Put otherwise, the communication device that joins the network in the infrastructure mode provides notification of joining the network in the communication layer (primarily the physical layer, MAC layer) of the 802.11 wireless LAN.

On the other hand, association processing is not performed between communicating communication devices in the ad-hoc mode. Namely, in the ad-hoc mode, even when another communication device joins a network, communication devices that already participate in the network are not notified of the fact that another communication device has joined the network in the communication layer of the 802.11 wireless LAN. For this reason, network-joining notification information is exchanged using an application (hereafter referred to as "upper-layer application") in a communication layer higher than the communication layer of the 802.11 wireless LAN. As a result, the communication device that constructed the network can recognize a communication device joining the network.

As an example, let us consider a case, in which a captured image is transmitted and received via an ad-hoc network between two digital cameras equipped with 802.11 wireless LAN features. It is assumed that the process of construction of an ad-hoc network is started when an instruction to commence connection is carried out in the two digital cameras.

In such a case, when an instruction to commence connection is issued from the sender digital camera, a network is constructed (transmission of a beacon is initiated) and the recipient digital camera joins the constructed network. When the process of joining is complete, the recipient digital camera notifies the upper-layer application of joining the network.

Upon construction of the network, the sender digital camera periodically searches for communication devices participating in the network using the upper-layer application (for instance, UPnP: Universal Plug & Play). When the results of the search indicate that a recipient digital camera has joined the network, a message prompting for image transfer instructions is displayed on the display of the sender digital camera. Subsequently, user instructions from an operator input unit are received and image transmission/reception is carried out via the ad-hoc network.

Here, if some time is required for the recipient digital camera to join the network, a certain time will pass between the moment when the instruction to commence connection is issued by the sender digital camera and the moment when the message prompting for image transfer instructions is displayed. In other words, user operability will suffer. Furthermore, similar problems arise with other methods of use (for instance, when a digital camera is remotely operated by another digital camera).

SUMMARY OF THE INVENTION

An embodiment of the present invention is directed to a communication apparatus that prevents duplicate networks from being constructed when the communication apparatus forms a network.

Furthermore, an embodiment of the present invention is directed to a communication apparatus that enhances user convenience.

According to one aspect of the present invention, there is provided a method used by communication apparatuses for forming a network for direct communication between communication apparatuses, comprising the steps of:

determining whether the communication apparatuses are a data sender or a recipient; and controlling the communication apparatuses, based on the results of determination in the determination step, to either construct a network or join a constructed network.

According to another aspect of the present invention, there is provided a communication apparatus comprising:

a determination device that determines whether the communication apparatuses are a data sender or recipient; and a control device that, based on the determination results of the determination unit, performs control so as to either construct a network for direct communication between the communication apparatuses or join a constructed network.

Further features of the present invention will become apparent from the following description of exemplary embodiments (with reference to the attached drawings).

DESCRIPTION OF THE EMBODIMENTS

Below, the best mode for carrying out the invention is explained in further detail with reference to drawings.

Figure 1:
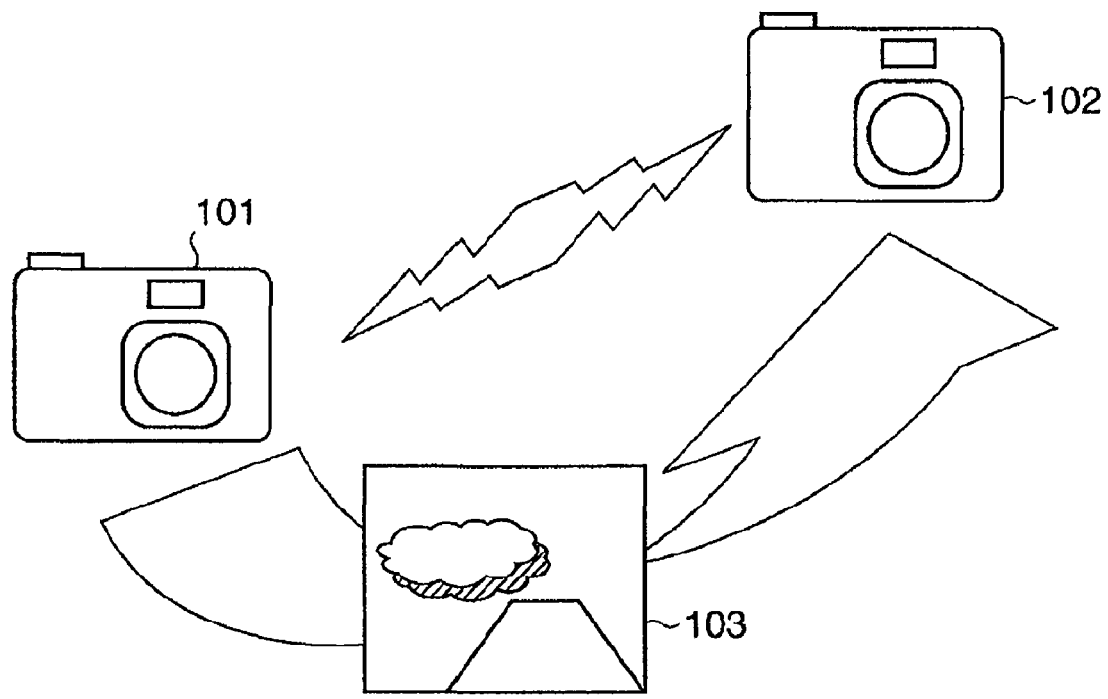
FIG. 1 is a diagram used to explain communication between communication devices in the ad hoc mode.

FIG. 1 is a diagram illustrating the configuration of the communication system used in the embodiments. Reference numerals 101 and 102 designate digital cameras that are equipped with a remote control feature and a wireless LAN feature used for transmitting and receiving captured images 103 via an 802.11 wireless LAN and are capable of communication in the ad-hoc mode. Here, the term "ad-hoc mode" refers to a communication mode, in which wireless communication is effected directly between communication devices operating as wireless terminals without going through an access point (base station). On the other hand, a communication mode, in which wireless communication is effected between communication devices operating as wireless terminals through the medium of an access point, is called the infrastructure mode.

Moreover, for the digital cameras 101 and 102 to communicate on the same network, wireless communication parameters, such as communication channels, network identifiers, encryption methods, and cryptographic keys, have to be set to common values. The network identifiers include the SSID, which is a first network identifier, and the BSSID, which is a second network identifier.

The SSID is an identifier that can be set to any arbitrary value by a user and can be as pre-configured in a communication device. Here, a common SSID has to be pre-configured for the digital cameras 101, 102 in advance.

Figure 11:
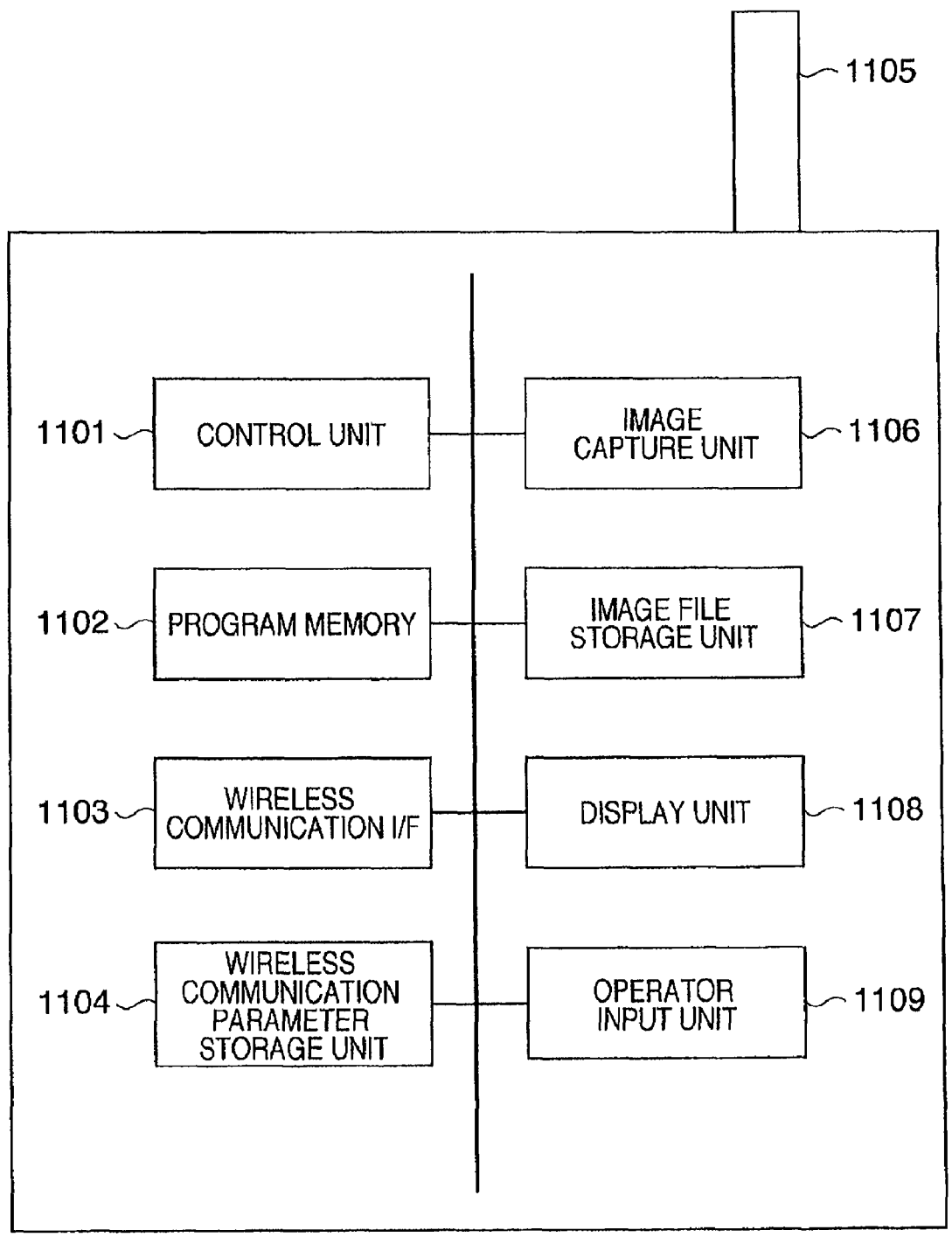
FIG. 11 is a diagram illustrating the block configuration of the digital cameras used in the embodiments.

Furthermore, the BSSID is an identifier arbitrarily generated by the communication device constructing an ad-hoc network, that is, the communication device that initially transmits a beacon, based on its own MAC address, etc. Here, when constructing an ad-hoc network, the digital camera generates a random value based on its own Media Access Control address. FIG. 11 is a diagram illustrating the block configuration of the digital cameras 101, 102.

1101 is a control unit exercising control over the entire digital camera and 1102 is a memory, in which the control unit 1101 stores software used to exercise various types of control and in which operating programs etc. used to perform the operations of FIGS. 4, 5, 6, 7, 9, and 10 are stored as well.

1103 is a wireless communication interface used for communication via an 802.11 wireless LAN and 1104 is a wireless communication parameters storage unit that stores wireless communication parameters used when effecting communication via the wireless communication interface 1103. As described above, a common SSID is stored in the digital cameras 101, 102 in advance. 1105 is an antenna used to transmit and receive wireless signals.

1106 is an image capture unit that captures images and 1107 is an image file storage unit, in which captured images etc. are stored by the image capture unit 1106.

1108 is a display unit presenting various displays to the user and 1109 is an operator input unit utilized by the user to perform various operations and used when making selections from the operating menu displayed on the display 1108.

Embodiment 1

The first embodiment illustrates a case, in which processing used for ad-hoc network formation changes depending on whether the operations are performed on the image sender or image recipient side.

Figure 2:
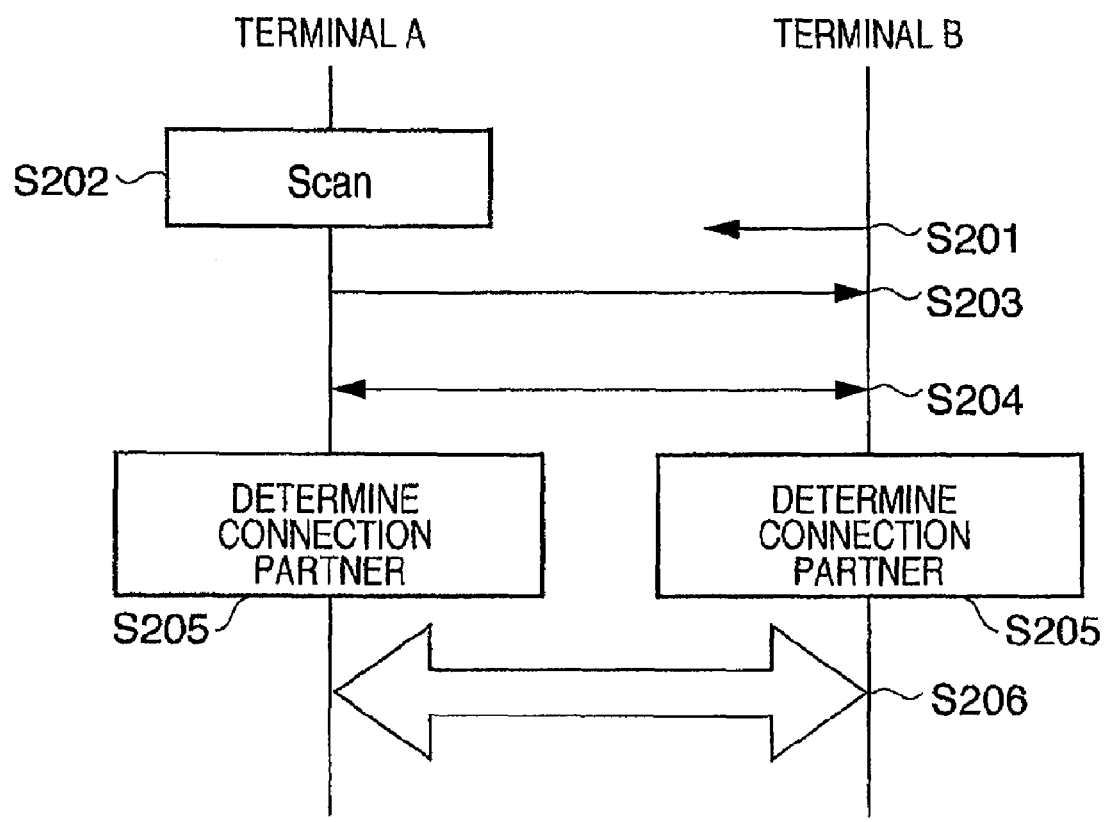
FIG. 2 is a diagram illustrating an operational sequence executed between two communication devices.

FIG. 2 is a diagram illustrating an operational sequence executed between two communication devices. In FIG. 2, the communication device A (digital camera 101) is a sender and the communication device B (digital camera 102) is a recipient.

First of all, the communication device B determines a BSSID based on the MAC address and transmits a beacon comprising the BSSID and a preset SSID (S201). On the other hand, the communication device A scans (searches for) networks with the preset SSID (S202). Scanning methods include passive scanning, during which the network is searched by monitoring a beacon, and active scanning, during which the network is searched by transmitting a probe request and receiving a response thereto. Although the case described herein makes use of passive scanning, active scanning may be used as well. If a network having the configured SSID is found as a result of the scan, the device joins the network using the BSSID contained in the beacon (S203).

Here, when the communication device A joins the network, communication devices A and B exchange respective device information (S204). Then, based on the exchanged device information, communication devices A and B determine whether they are correspondents that are supposed to be connected (S205). If the results of determination indicate that these are correspondents supposed to be connected, a connection is established and communication, such as transmission of images, etc., is effected (S206).

Next, operation in a communication mode called the "image transmission/reception mode" is explained in detail with reference to FIG. 3-FIG. 5.

Figure 3:
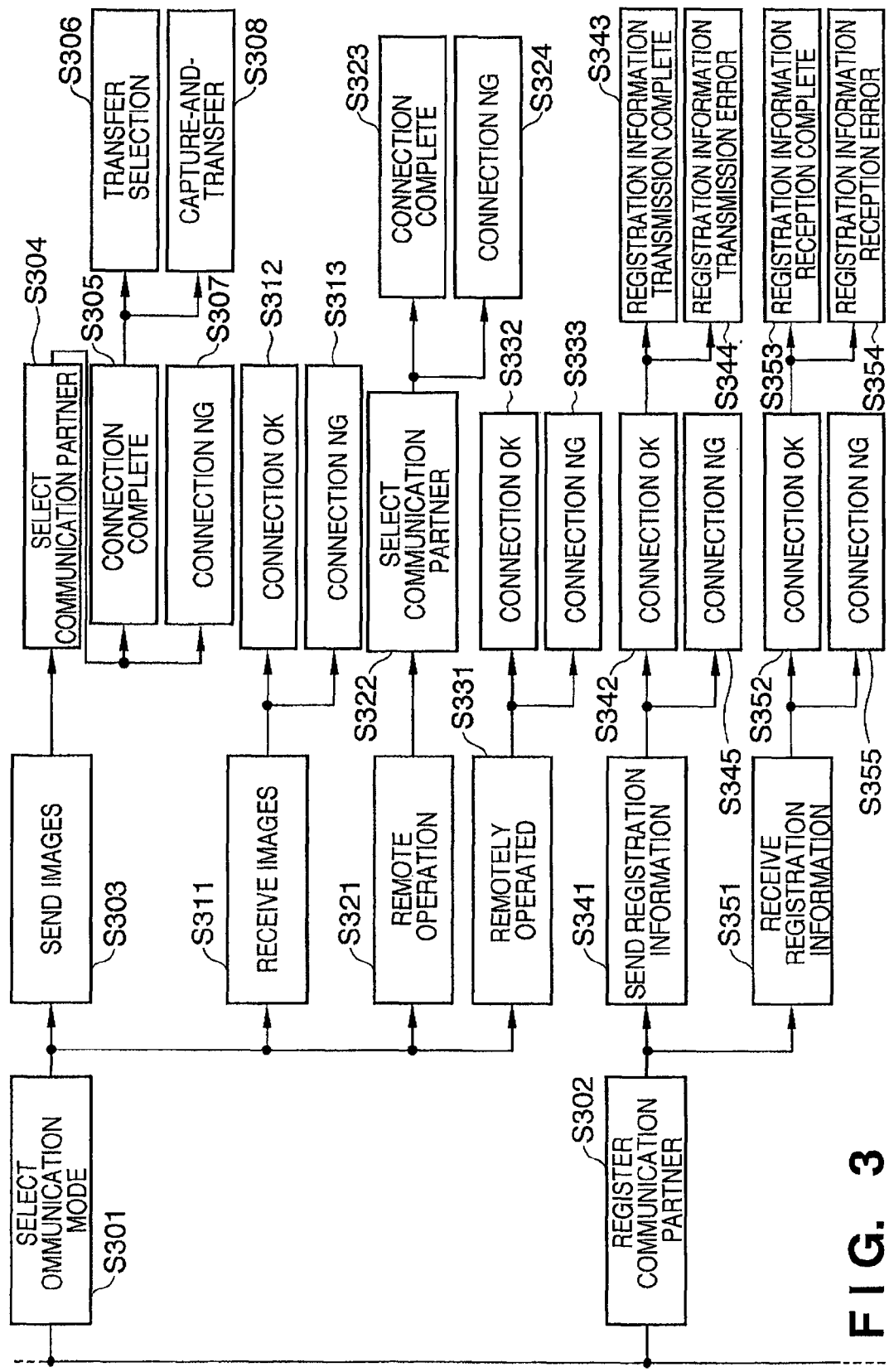
FIG. 3 is a diagram illustrating an example of operational menu items used in communication devices.

FIG. 3 is a diagram illustrating an example of operational menu items used in the communication devices. This operational menu is displayed on the display unit 1108 when a predetermined application (hereinafter referred to as the "upper-layer application") is launched in a communication layer higher than the communication layer of the 802.11 wireless LAN. The user can select the desired items from among the displayed items by manipulating the operator input unit 1109. FIG. 4 is a flow chart illustrating processing on the sender communication device A (digital camera 101) side in the first embodiment. In addition, FIG. 5 is a flow chart illustrating processing on the recipient communication device B (digital camera 102) side in the first embodiment.

First of all, during transmission and reception of a captured image, the user launches the predetermined upper-layer application in both communication devices A and B and chooses "Select Communication Mode" from the operational menu items displayed on the display unit 1108 when it is launched (S301). At this point, the user selects "Transmit Image" in the communication device A (sender) (s303) and, subsequently, selects the image-transmitting communication partner (here, the communication device B) from among pre-registered communication devices (S304). The user then waits for wireless connection to the recipient communication device B on the UI.

Figure 4:
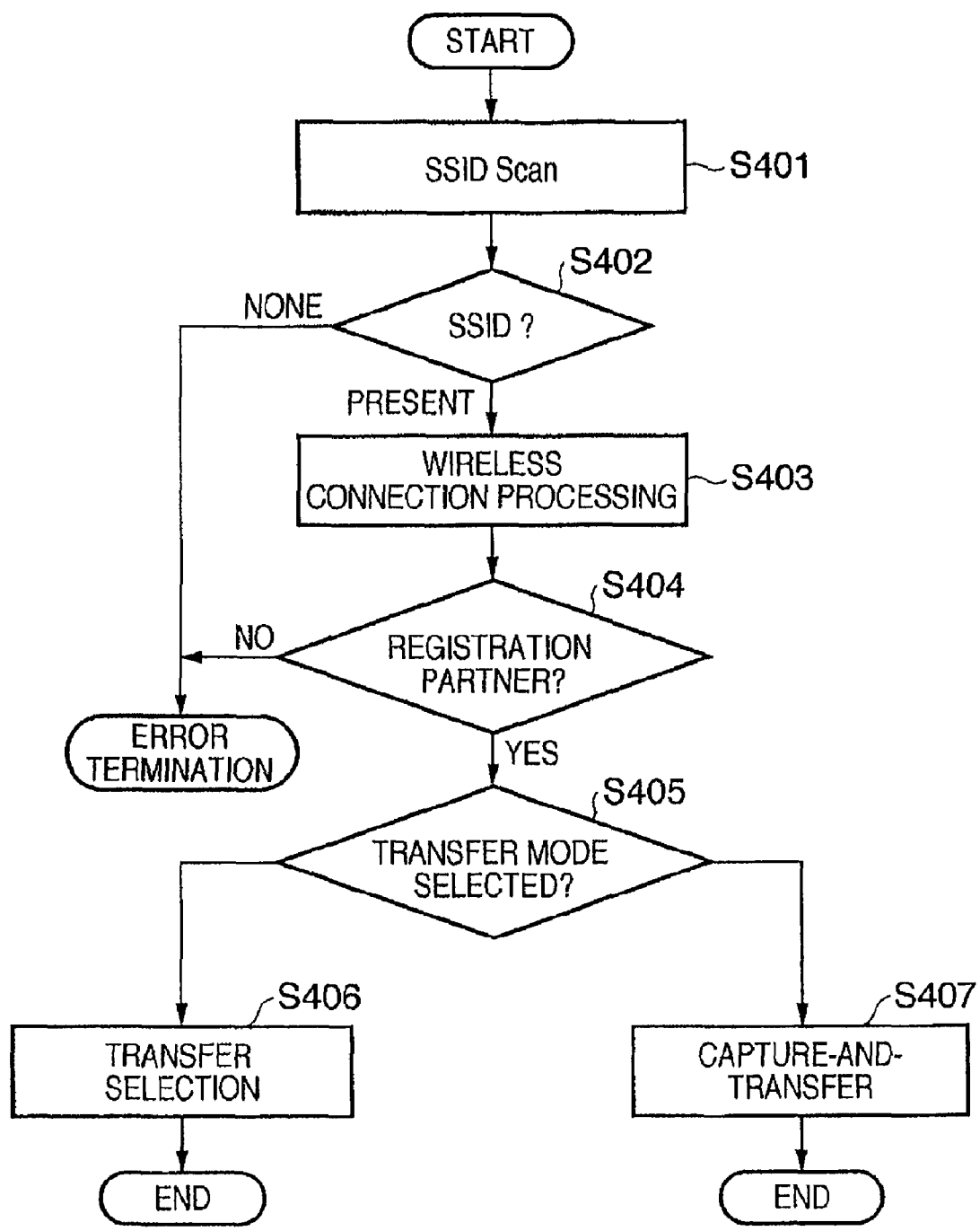
FIG. 4 is a flow chart illustrating processing on the sender side in the first embodiment.
Figure 5:
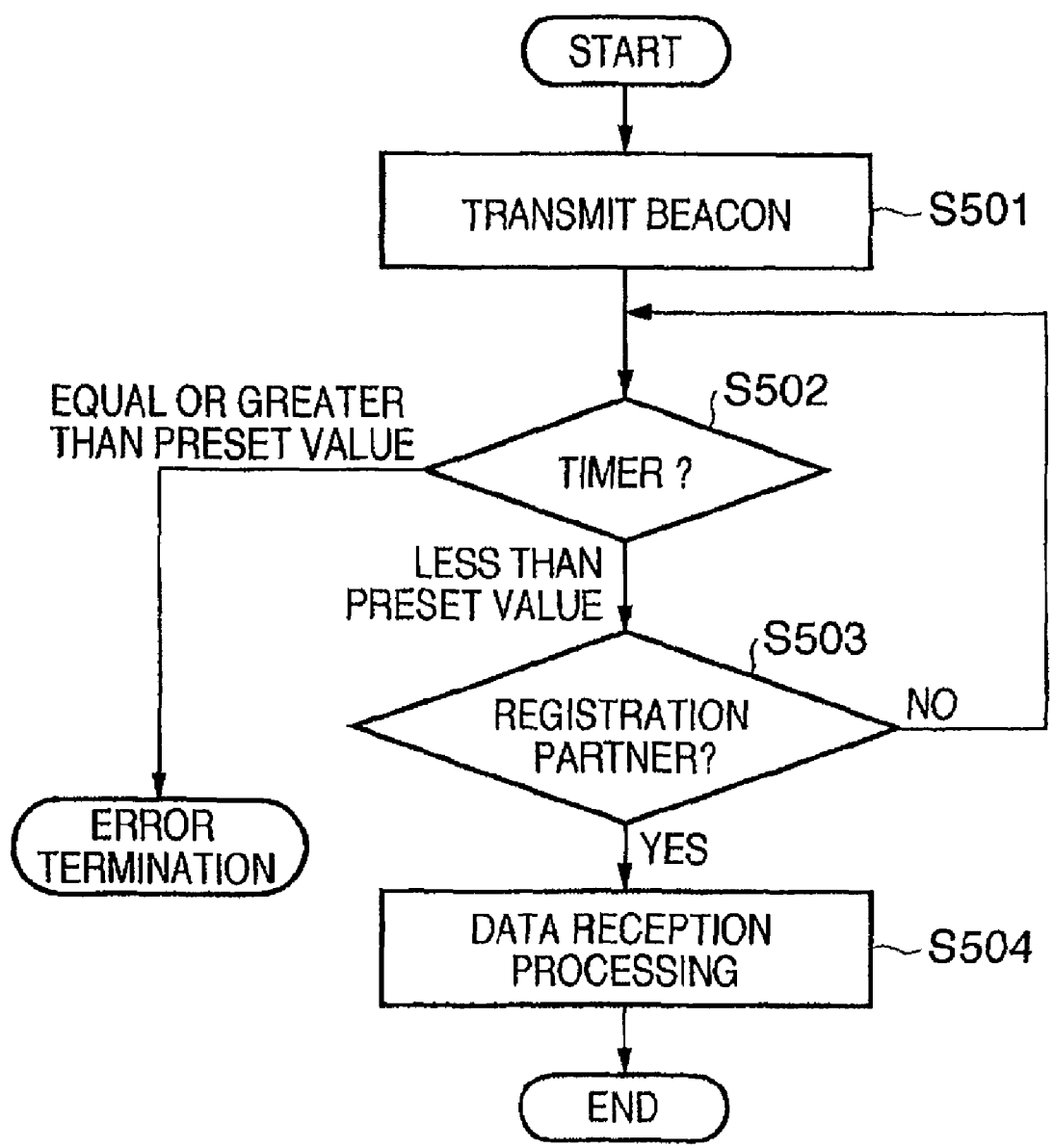
FIG. 5 is a flow chart illustrating processing on the recipient side in the first embodiment.

At such time, the communication device A executes the processing illustrated in FIG. 4. First of all, a scan is executed to determine whether there is a network having the preset SSID (S401). Based on the scanning results, a determination is made as to the presence/absence of a network having the preset SSID (S402). If no networks having the SSID are found as a result of determination, the process terminates with an error and a "Connection NG" message is displayed on the UI (S307).

On the other hand, if a network having the SSID is found, connection processing is executed (S403) and a determination is made as to whether the connection partner is the partner selected in S304 (S404). If the results of determination indicate that this is not the selected partner, the process terminates with an error and a "Connection NG" message is displayed on the UI (S307). Furthermore, if it is determined to be the selected partner, a "Connection Complete" message is displayed (S305) and the user is prompted to select a transfer mode (S405). Here, depending on user selection, processing advances to "Selected Image Transfer Mode" (S306, S406) or "Capture-and-Transfer Mode" (S308, S407). It should be noted that the "Selected Image Transfer Mode" is a transfer mode used to transfer image files specified by the user among the image files stored in the image file storage unit 1107. The "Capture-and-Transfer Mode" is a transfer mode used for dynamically transferring images captured by the image capture unit 1106 during connection. The selected transfer mode is then utilized for image data transmission to the connection partner (in this case, the communication device B) via the ad-hoc network. Subsequently, the processing of the communication device A (sender) is terminated by an end operation of the user or timeout.

Furthermore, subsequent to the item "Select Communication Mode", the user selects "Receive Images" (S311) from the operational menu items in the communication device B (captured image recipient). Subsequent to this selection, the communication device B executes the processing illustrated in FIG. 5. First of all, a random value calculated based on the MAC address of the communication device B is determined as the BSSID and the transmission of a beacon comprising the BSSID and the preset SSID is initiated (S501). A timer is then activated and the device waits for a connection request from a pre-registered partner for a predetermined time period (S502). Here, if no connection requests are received from pre-registered partners within the predetermined time period, the process terminates with an error and a "Connection NG" message is displayed on the UI (S313).

On the other hand, if a connection request is received within the predetermined time period, a determination is made as to whether this is a connection request from a pre-registered partner (S503). If the results of determination indicate that this is indeed a pre-registered partner, a "Connection OK" message is displayed on the UI (S312). Reception processing of the image data transmitted from the connection partner (in this case, the communication device A) is then executed (S504).

As described above, in accordance with the present embodiment, the choice between network construction and joining a network can be uniquely defined by specifying whether the device is an image sender or recipient in the upper-level application. As a result, duplicate network construction, during which networks with different BSSIDs are constructed despite the identical SSIDs, can be avoided even when two communication devices operate nearly simultaneously.

Moreover, as described above, after the image-sending communication device constructs the network, it is necessary to carry out periodic searches using UPnP or another upper-level application in order to check whether a recipient communication device has joined the network. For this reason, if the search takes time, some time passes before the user is prompted for image transfer instructions. In accordance with the present embodiment, participation in the ad-hoc network is complete immediately upon selection of the communication partner in the image-sending communication device. The upper-level application is then notified of the fact of joining the network, as a result of which the user can be prompted for image transfer instructions, thereby improving user operability.

Embodiment 2

Next, a second embodiment of the present invention will be explained in detail by referring to drawings. In the second embodiment, FIGS. 3 and 6 to 8 are used to explain processing that takes place in a communication mode called the remote operation mode, in which a distant camera is remotely operated by a digital camera.

Figure 8:
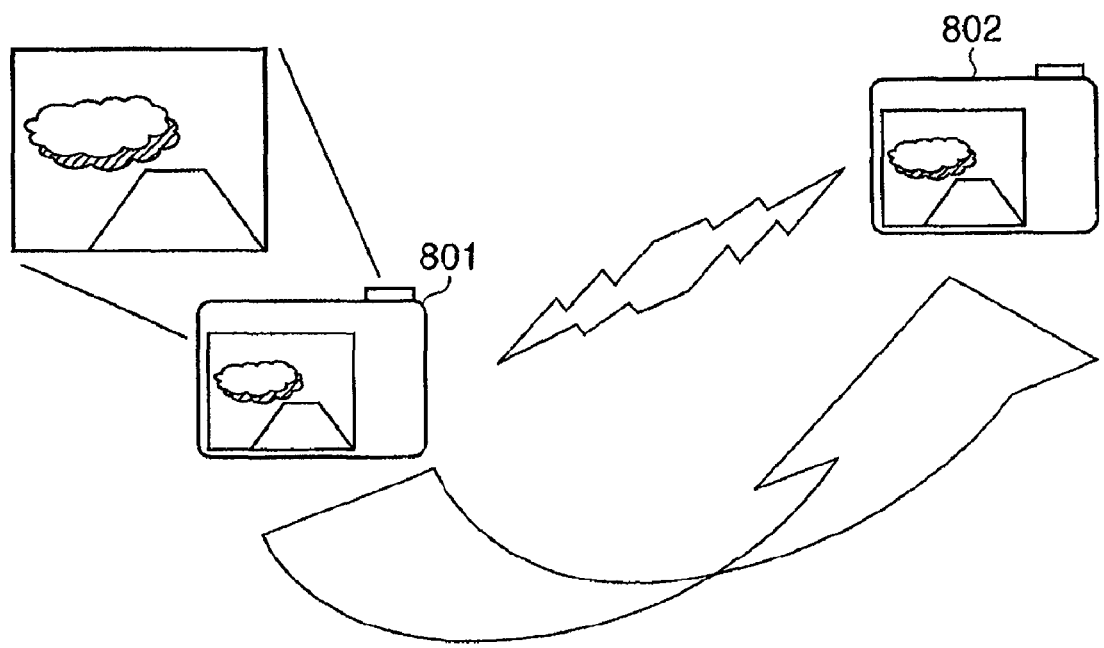
FIG. 8 is a schematic diagram illustrating remote operation in the second embodiment.

FIG. 8 is a schematic diagram illustrating remote operation in the second embodiment. FIG. 8 illustrates a case, in which a digital camera 802, which is a remotely operated camera, is remotely operated by a remote operating digital camera 801. In other words, the remote operating digital camera 801 is a device sending operational command data. Furthermore, the remotely operated digital camera 802 is a device receiving operational command data.

Figure 6:
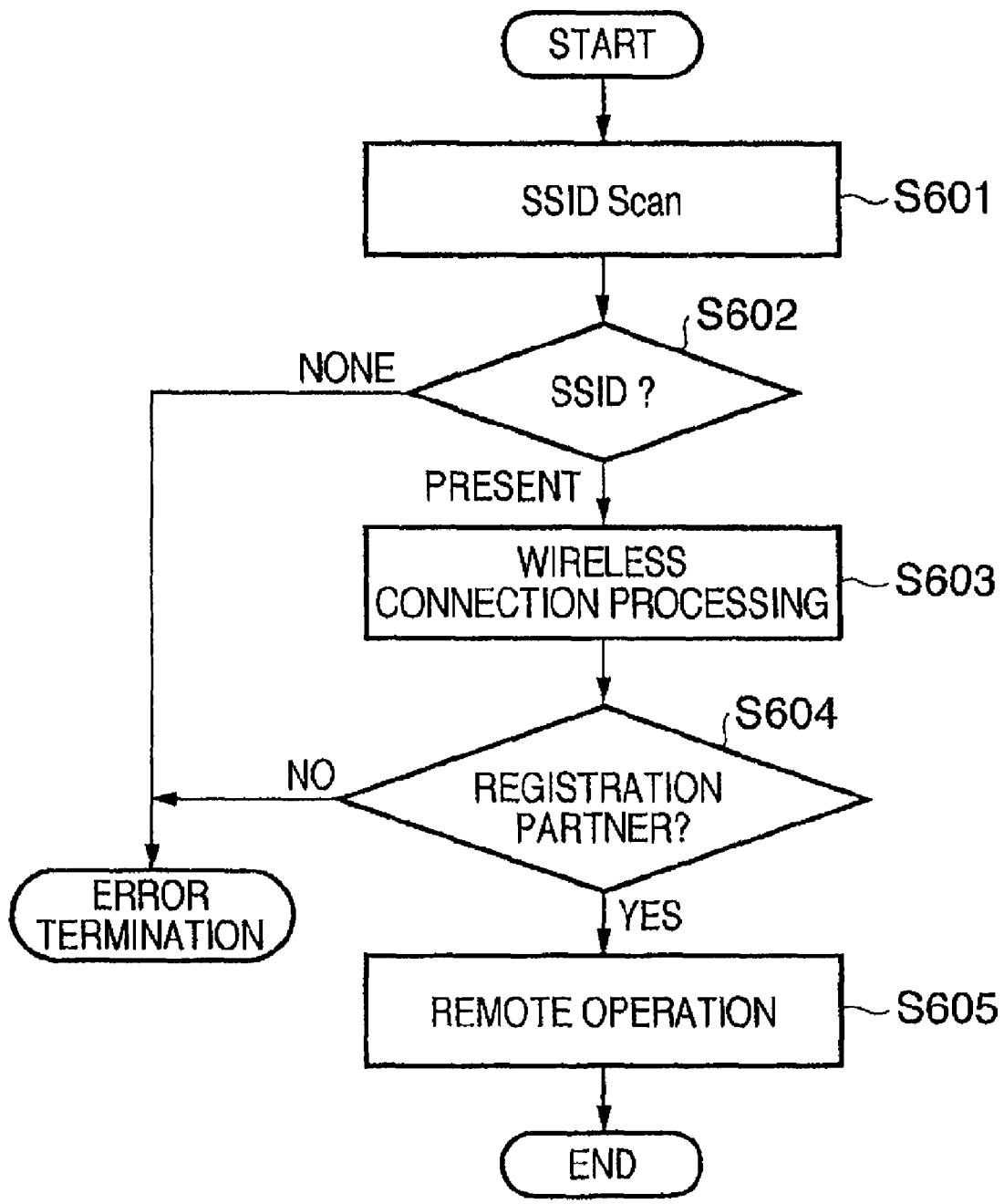
FIG. 6 is a flow chart illustrating processing on the remote operating side in the second embodiment.
Figure 7:
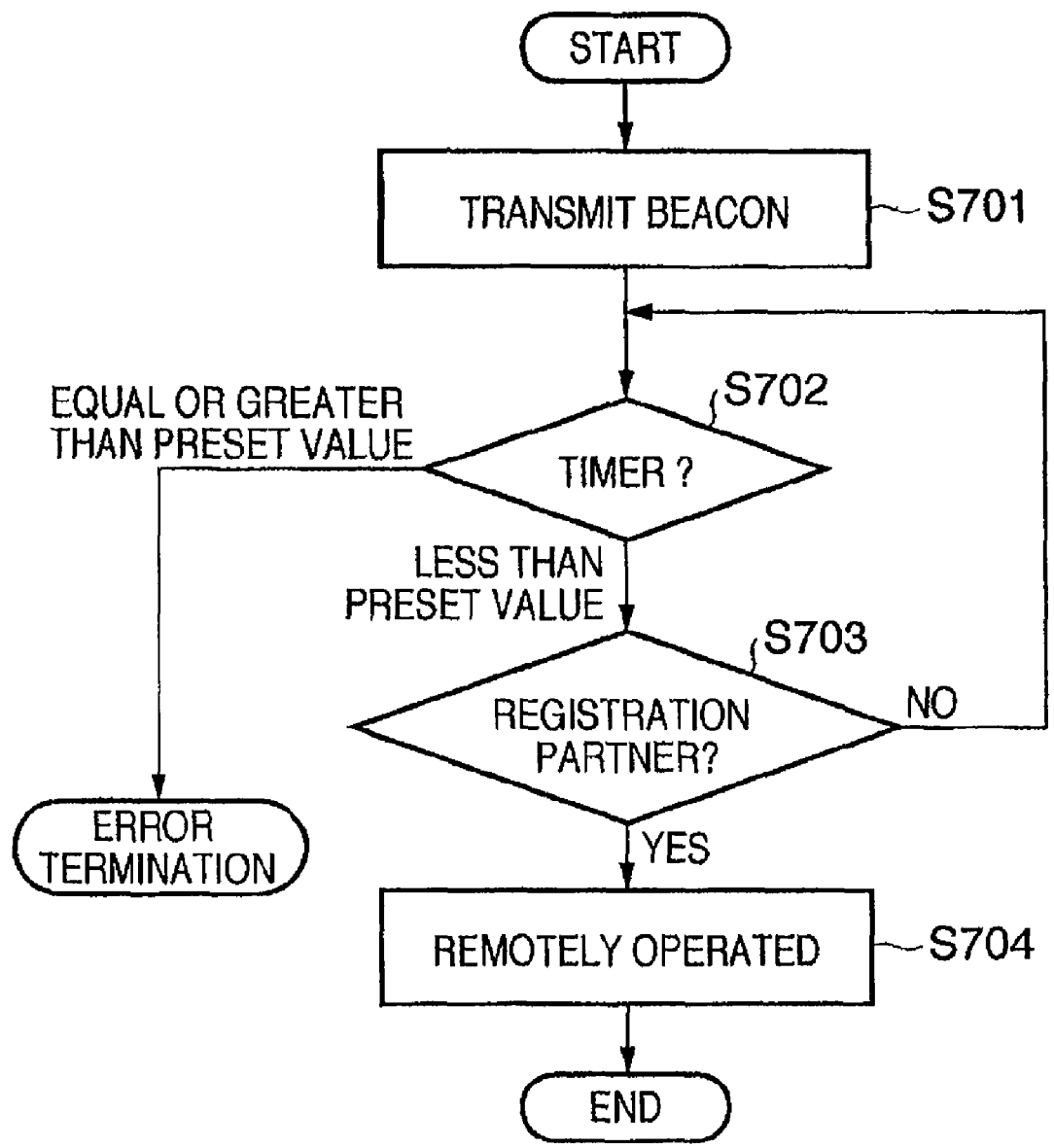
FIG. 7 is a flow chart illustrating processing on the remotely operated side in the second embodiment.

FIG. 6 is a flow chart illustrating processing on the remote operating communication device A (digital camera 801) side in the second embodiment. Moreover, FIG. 7 is a flow chart illustrating processing on the remotely operated communication device B (digital camera 802) side in the second embodiment.

First of all, when the communication device A remotely operates the communication device B, in the same manner as in the first embodiment, the user starts up a predetermined upper-level application in the communication devices A, B. The item "Select Communication Mode" is then selected from the operational menu items displayed on the display unit 1108 when the predetermined upper-level application is launched (S301). At this point, the user selects "Remote Operation" in the communication device A (remote operating device) (S321) and, subsequently, selects the remotely operated communication partner (here, the communication device B) from among pre-registered communication devices (S322). The user then waits for wireless connection to the remotely operated communication device B on the UI.

At such time, the communication device A executes the processing illustrated in FIG. 6. First of all, a scan is executed to determine whether there is a network having the preset SSID (S601). Based on the scanning results, a determination is made as to the presence/absence of a network having the preset SSID (S602). If no networks having the SSID are found as a result of determination, the process terminates with an error and a "Connection NG" message is displayed on the UI (S324).

On the other hand, if a network having the SSID is found, connection processing is executed (S603) and a determination is made as to whether the connection partner is the partner selected in S322 (S604). If as a result of determination it is found that this is not the selected partner, the process terminates with an error and a "Connection NG" message is displayed on the UI (S324). Moreover, if it is the selected partner, a "Connection Complete" message is displayed (S323). The user then operates the communication device A, as a result of which remote operation of the connection partner (communication device B) is executed via the ad-hoc network (S605).

Moreover, subsequent to the item "Select Communication Mode", the user selects "Remotely Operated" (S331) from the operational menu items in the communication device B (remotely operated device). Subsequent to this selection, the communication device B executes the processing illustrated in FIG. 7. First of all, a random value calculated based on the MAC address of the communication device B is determined as the BSSID and the transmission of a beacon comprising the BSSID and the preset SSID is initiated (S701). A timer is then activated and the device waits for a connection request from pre-registered partners for a predetermined time period (S702). Here, if no connection requests are received from pre-registered partners within the predetermined time period, the process terminates in an error and a "Connection NG" message is displayed on the UI (S333).

On the other hand, if a connection request is received within the predetermined time period, a determination is made as to whether this is a connection request from a pre-registered partner (S703). If the results of determination indicate that this is a pre-registered partner, a "Connection OK" message is displayed on the UI (S332) and remotely operated processing is executed in accordance with instructions from the connection partner (in this case, the remote operating communication device A) (S704).

As described above, in accordance with the present embodiment, the choice between network construction and joining a network can be uniquely defined by specifying whether the device is a remote operating device or a remotely operated device in the upper-level application. As a result, duplicate network construction, during which networks with different BSSIDs are constructed despite the identical SSIDs, can be avoided even when two communication devices operate nearly simultaneously.

Moreover, after the remote operating communication device constructs the network, it is necessary to carry out periodic searches using UPnP or another upper-level application in order to check whether a remotely operated communication device has joined the network. For this reason, if the search takes time, some time passes before the operator recognizes that remote operation has been enabled. In accordance with the present embodiment, participation in the ad-hoc network is complete immediately upon selection of the communication partner in the remote operating communication device. The upper-level application is then notified of the fact of joining the network, as a result of which the user can be notified that remote operation has been enabled, thereby improving user operability.

Embodiment 3

Figure 9:
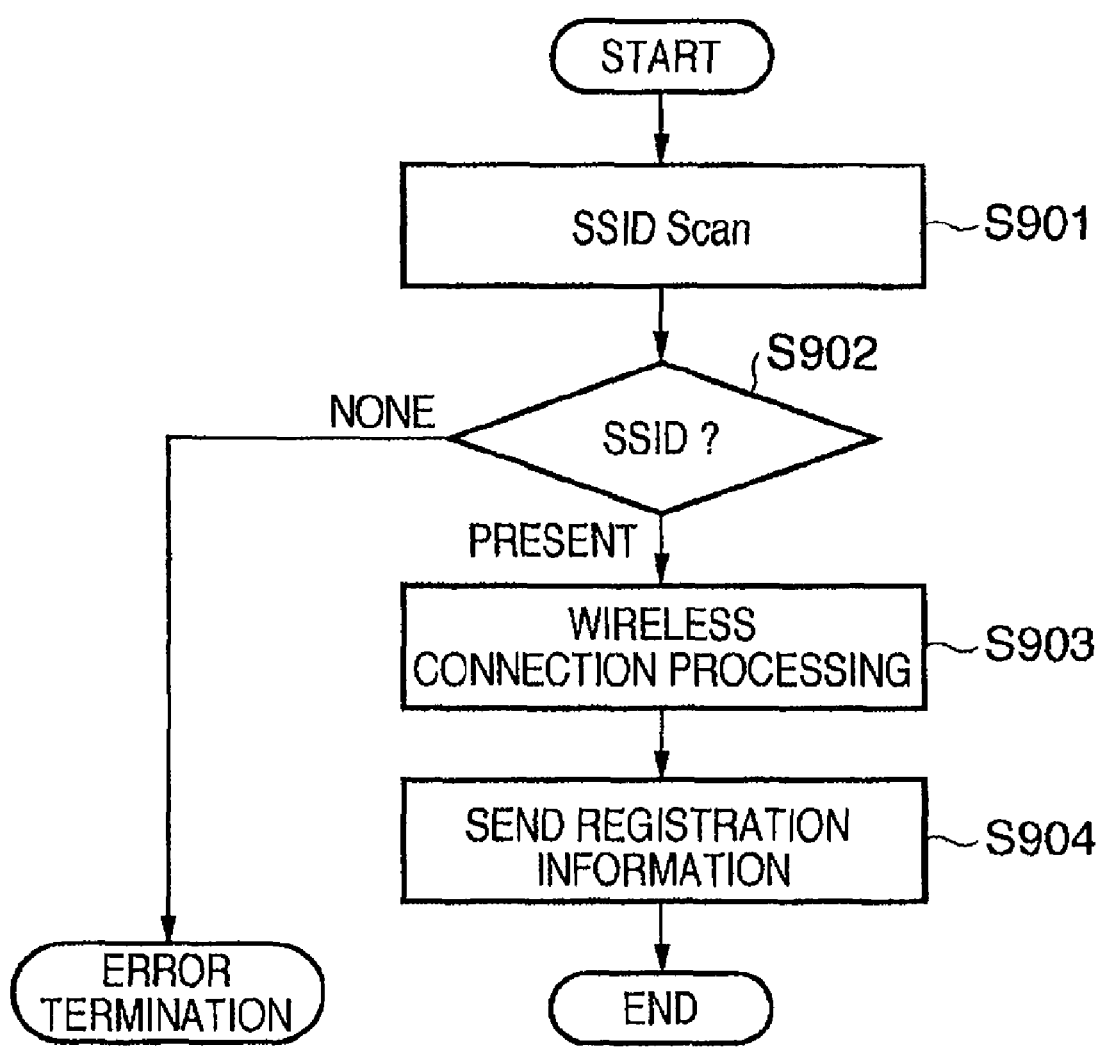
FIG. 9 is a flow chart illustrating processing performed by the registration information sender in the third embodiment.
Figure 10:
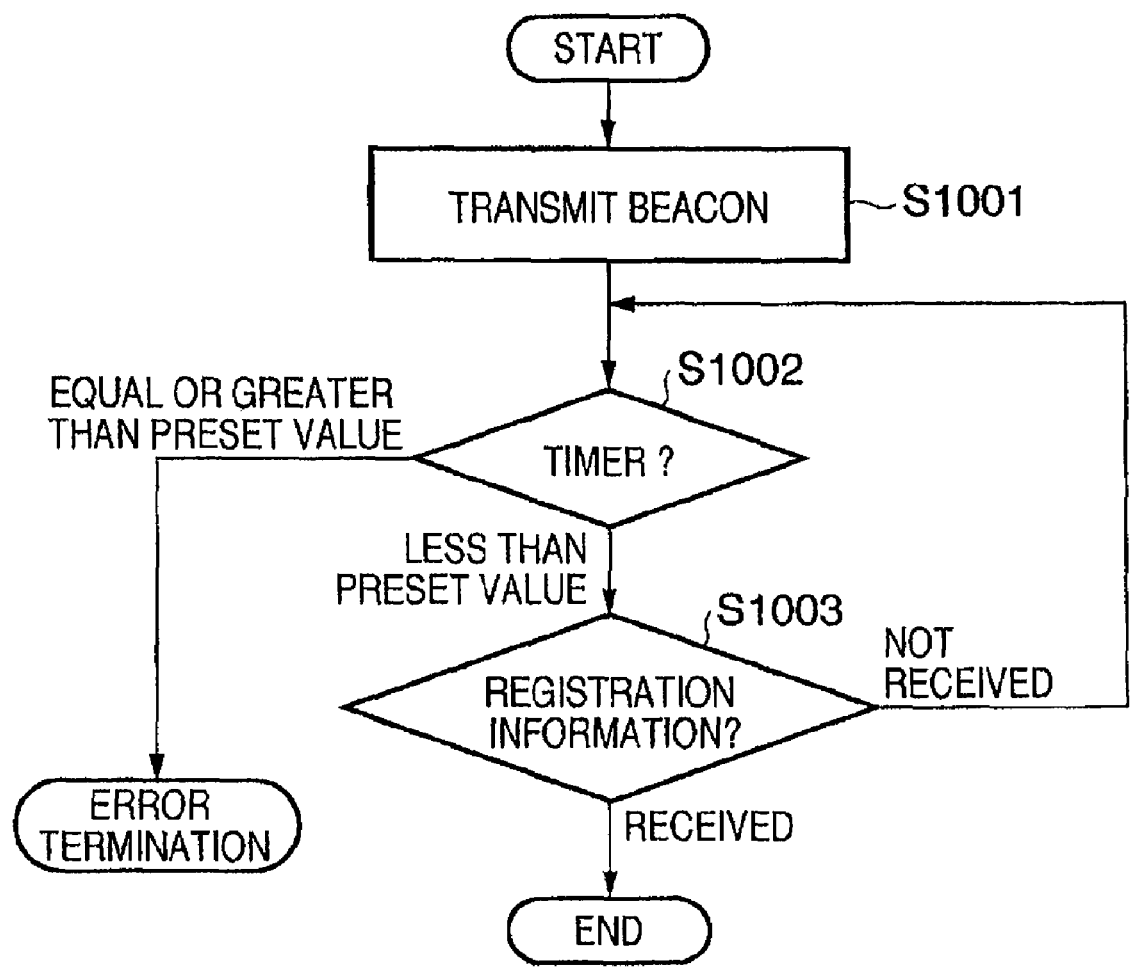
FIG. 10 is a flow chart illustrating processing on the registration information recipient side in the third embodiment.

Next, a third embodiment of the present invention will be explained in detail by referring to drawings. In the third embodiment, FIGS. 3, 9, and 10 are used to explain processing taking place in the communication partner registration mode. It should be noted that registration information transmitted and received in the communication partner registration mode includes MAC addresses, device types (digital camera, printer, etc.), device attributes (input device, output device, etc.), and corresponding application information (direct print feature, etc.).

FIG. 9 is a flow chart illustrating processing performed by the registration information-sending communication device A (digital camera 101) in the third embodiment. In addition, FIG. 10 is a flow chart illustrating processing taking place in a registration information-receiving communication device B (digital camera 102) side in the third embodiment. It should be noted that pre-determined SSIDs (hereafter referred to as registration SSIDs), which are employed when forming a network used for the transmission and reception of registration information, are assumed to be stored in the wireless parameter storage units 1104 of the communication devices A, B.

First of all, when wirelessly carrying out transmission and reception of registration information, the user starts up a predetermined upper-level application in the communication devices A, B. The item "Register Communication Partner" is then selected from the operational menu items displayed on the display unit 1108 when the predetermined upper-level application is launched (S302). At this point, the user selects "Send Registration Information" in the communication device A (sender transmitting the registration information) (S341). The communication device A then executes the processing illustrated in FIG. 9.

First of all, a scan is executed to determine whether there is a network having the registration SSID (S901). Based on the results of the scan, a determination is made as to the presence/absence of a network having the registration SSID (S902). If no networks having the registration SSID are found as a result of determination, the process terminates with an error and a "Connection NG" message is displayed on the UI (S345).

On the other hand, wireless connection processing is carried out if a network having the registration SSID is found (S903), and a "Connection OK" message is displayed on the UI (S342). Upon connection, registration information is transmitted to the partner (S904) and a "Registration Information Transmission Complete" message is displayed when the transmission is over (S343). Moreover, if the transmission fails, a "Registration Information Transmission Error" message is displayed (S344).

Moreover, the user selects "Receive Registration Information" from the operational menu items in the communication device B (recipient receiving the registration information) (S351). The communication device B then executes the processing illustrated in FIG. 10. First of all, a random value calculated based on the MAC address of the communication device B is determined as the BSSID and the transmission of a beacon comprising the BSSID and the registration SSID is initiated (S1001). A timer is then activated and the device waits for receipt of registration information for a predetermined time period (S1002). Here, if no registration information is received within the predetermined time period, the process terminates with an error and a "Connection NG" message is displayed on the UI (S355).

On the other hand, if registration information is received within the predetermined time period, a "Connection OK" message is displayed on the UI (S352), and a "Registration Information Receipt Complete" message is displayed (S103, S353). Subsequently, wireless communication is effected based on the received registration information. Moreover, if no registration information is received, a "Registration Information Reception Error" message is displayed (S354).

As described above, in accordance with the present embodiment, the choice between network construction and joining a network can be uniquely defined by specifying whether the device is a registration information sender or recipient in the upper-level application. As a result, duplicate network construction, during which networks with different BSSIDs are constructed despite the identical SSIDs, can be avoided even when two communication devices operate nearly simultaneously. In addition, user convenience is improved because an ad-hoc network is immediately formed and registration information transmission/reception is carried out by specifying items "Send Registration Information" or "Receive Registration Information" in the upper-level application.

It should be noted that the present invention may be applied to a system composed of multiple devices (for example, a host computer, interface devices, readers, printers, etc.) as well as to an apparatus constituted by a single device (e.g. a copy machine, a fax machine, etc.).

In addition, recording media storing the program code of software implementing the functionality of the above-described embodiments are provided to a system or apparatus, with the computer (CPU or MPU) of the system or apparatus reading and executing the program code stored on the recording media. Quite naturally, this also makes it possible to attain the object of the invention.

In such a case, the program code read from the computer-readable recording media implements the functionality of the above-described embodiments and the recording media, on which the program code is stored, form part of the present invention.

Flexible disks, hard disks, optical disks, magneto-optical disks, CD-ROMs, CD-Rs, magnetic tape, nonvolatile memory cards, ROM, etc. can be used as the recording media, on which the program code is supplied.

Furthermore, quite naturally, the implementation of the functionality of the above-described embodiments is based not only on the execution of the program code read by the computer and may also include the following cases. Namely, these are cases, in which the functionality of the above-described embodiments is implemented if an OS (operating system) etc. running on a computer partially or entirely performs actual processing based on the instructions of the program code.

Furthermore, the program code read from the recording media is written to memory provided in an expansion board inserted into the computer or an expansion unit connected to the computer. Needless to say, the invention also includes cases, in which a CPU, etc. provided in an expansion board or expansion unit partially or entirely performs actual processing to implement the functionality of the above-described embodiments based on such processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-107624, filed Apr. 16, 2007, which is hereby incorporated by reference herein in its entirety.

What is claimed is:

1. A method used by communication apparatuses for forming a network for direct communication between communication apparatuses, comprising the steps of:
   determining whether the communication apparatuses are a data sender or a recipient; and
   controlling the communication apparatuses, based on the results of determination in the determination step, to either construct a network or join a constructed network,
   wherein in the determination step, based on user operations, a determination is made as to whether the communication apparatuses are a data sender or data recipient, and
   in the control step, the communication apparatuses are controlled so as to construct the network if it is determined in the determination step that it is a data recipient and join the constructed network if it is determined that it is a data sender.

2. The method according to claim 1,
   wherein the network can be identified by a first network identifier and a second network identifier, and
   the second network identifier is determined when constructing a network.

3. The method according to claim 2,
   wherein the first network identifier is stored in the communication apparatuses in advance.

4. The method according to claim 1,
   wherein communication between the communication apparatuses is effected via a plurality of communication layers and
   determination in the determination step is carried out by an application in a communication layer higher than the communication layer in which the network is formed.

5. The method according to claim 1,
   wherein the data includes image data, operational commands used for remotely operating communication partners, or the registration information of the communication apparatuses.

6. A computer-readable storage medium storing a software program, for causing a computer to execute the network formation method according to claim 1.

7. A method used by communication apparatuses for forming a network for direct communication between communication apparatuses, comprising the steps of:
   determining whether the communication apparatuses are a data sender or a recipient; and controlling the communication apparatuses, based on the results of determination in the determination step, to either construct a network or join a constructed network, wherein, in the determination step, a determination is made as to whether the communication apparatuses are a remote operating apparatus or remotely operated apparatus, and in the control step, control is performed so as to construct the network if it is determined in the determination step that it is a remotely operated apparatus and join the constructed network if it is determined that it is a remote operating apparatus.

8. The method according to claim 7, wherein the network can be identified by a first network identifier and a second network identifier, and the second network identifier is determined when constructing a network.

9. The method according to claim 8, wherein the first network identifier is stored in the communication apparatuses in advance.

10. The method according to claim 7, wherein communication between the communication apparatuses is effected via a plurality of communication layers and determination in the determination step is carried out by an application in a communication layer higher than the communication layer in which the network is formed.

11. The method according to claim 7, wherein the data includes image data, operational commands used for remotely operating communication partners, or the registration information of the communication apparatuses.

12. A computer-readable storage medium storing a software program for causing a computer to execute the network formation method according to claim 7.

13. A communication apparatus comprising:

a determination device that determines whether the communication apparatuses are a data sender or recipient; and a control device that, based on the determination results of the determination unit, performs control so as to either construct a network for direct communication between the communication apparatuses or join a constructed network, wherein the determination device, based on user operations, determines whether the communication apparatuses are a data sender or data recipient, and the control device performs control so as to construct the network if it is determined by the determination device that it is a data recipient and join the constructed network if it is determined that it is a data sender.

14. The apparatus according to claim 13, wherein the network can be identified by a first network identifier and a second network identifier, and the second network identifier is determined when constructing a network.

15. The apparatus according to claim 14, wherein the first network identifier is stored in the communication apparatuses in advance.

16. The apparatus according to claim 13, wherein communication between the communication apparatuses is effected via a plurality of communication layers and the determination device is implemented by an application in a communication layer higher than the communication layer in which the network is formed.

17. The apparatus according to claim 13, wherein the data includes image data, operational commands used for remotely operating communication partners, or the registration information of the communication apparatuses.

18. A communication apparatus comprising:

a determination device that determines whether the communication apparatuses are a data sender or recipient; and a control device that, based on the determination results of the determination unit, performs control so as to either construct a network for direct communication between the communication apparatuses or join a constructed network, wherein the determination device determines whether the communication apparatuses are a remote operating apparatus or remotely operated apparatus, and the control device performs control so as to construct the network if it is determined by the determination device that it is a remotely operated apparatus and join the constructed network if it is determined that it is a remote operating apparatus.

19. The apparatus according to claim 18, wherein the network can be identified by a first network identifier and a second network identifier, and the second network identifier is determined when constructing a network.

20. The apparatus according to claim 19, wherein the first network identifier is stored in the communication apparatuses in advance.

21. The apparatus according to claim 18, wherein communication between the communication apparatuses is effected via a plurality of communication layers and the determination device is implemented by an application in a communication layer higher than the communication layer in which the network is formed.

22. The apparatus according to claim 18, wherein the data includes image data, operational commands used for remotely operating communication partners, or the registration information of the communication apparatuses.

* * * * *